(12) United States Patent
Lee et al.

(10) Patent No.: US 9,019,376 B2
(45) Date of Patent: Apr. 28, 2015

(54) COMPUTING DEVICE AND METHOD FOR CONTROLLING UNMANNED AERIAL VEHICLE TO CAPTURE IMAGES

(71) Applicant: Zhongshan Innocloud Intellectual Property Services Co., Ltd., Zhongshan (CN)

(72) Inventors: Hou-Hsien Lee, New Taipei (TW);
Chang-Jung Lee, New Taipei (TW);
Chih-Ping Lo, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 89 days.

(21) Appl. No.: 13/719,046

(22) Filed: Dec. 18, 2012

(65) Prior Publication Data

US 2013/0162822 A1   Jun. 27, 2013

(30) Foreign Application Priority Data

Dec. 27, 2011  (TW) .............................. 100148859 A

(51) Int. Cl.
  *H04N 7/18*   (2006.01)
(52) U.S. Cl.
  CPC .............. *H04N 7/183* (2013.01); *H04N 7/185* (2013.01)
(58) Field of Classification Search
  USPC ........................................................ 348/144
  See application file for complete search history.

(56) References Cited

U.S. PATENT DOCUMENTS

| | | | |
|---|---|---|---|
| 2006/0077255 A1* | 4/2006 | Cheng | 348/143 |
| 2007/0286456 A1* | 12/2007 | Ariyur et al. | 382/103 |
| 2008/0054158 A1* | 3/2008 | Ariyur et al. | 250/203.1 |
| 2009/0157233 A1* | 6/2009 | Kokkeby et al. | 701/3 |
| 2010/0017046 A1* | 1/2010 | Cheung et al. | 701/2 |

OTHER PUBLICATIONS

Target Acquisition, Localization, and Surveillance Using a Fixed-Wing Mini-UAV and Gimbaled Camera, Quigley et al. Proceedings of the 2005 IEEE International Conference on Robotics and Automation, pp. 2,000-2,006, Apr. 2005.*
Target Acquisition, Localization, and Surveillancel Using a Fixed Wing Mini-AUV and Gimbaled Camera, Quigley, et al., Proceedings of the 2005 IEEE International Conference on Robotics and Automation, pp. 2,000-2,006.*

* cited by examiner

*Primary Examiner* — Jessica M Prince
(74) *Attorney, Agent, or Firm* — Novak Druce Connolly Bove + Quigg LLP

(57) ABSTRACT

In a method for controlling an unmanned aerial vehicle (UAV) equipped with a camera to capture images of a target, the computing device sets coordinates of a target, initial coordinates of the camera, and an initial viewing direction of the camera. Real-time coordinates and a real-time viewing direction of the camera are obtained when the UAV flies around the target. Accordingly, adjustment parameters of the camera are calculated and transferred to a driver system connected to the camera, such that the driver system adjusts the camera to face the target according to the adjusting parameters.

15 Claims, 5 Drawing Sheets

COMPUTING DEVICE AND METHOD FOR CONTROLLING UNMANNED AERIAL VEHICLE TO CAPTURE IMAGES

BACKGROUND

1. Technical Field

The embodiments of the present disclosure relate to image capturing technology, and particularly to a computing device and method for controlling an unmanned aerial vehicle to capture images of a target.

2. Description of Related Art

An unmanned aerial vehicle (UAV), also known as an unmanned aircraft system (UAS) or a remotely piloted aircraft (RPA), are controlled remotely. UAVs are often preferred for missions that are too dull or dangerous for manned aircraft. For example, a UAV is equipped with a camera and is remotely piloted to a dangerous region to capture images of that region. While piloting the UAV, the navigator or pilot may be unable to adjust an orientation of the camera of the UAV, so that the camera cannot capture images of a target. Therefore, there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
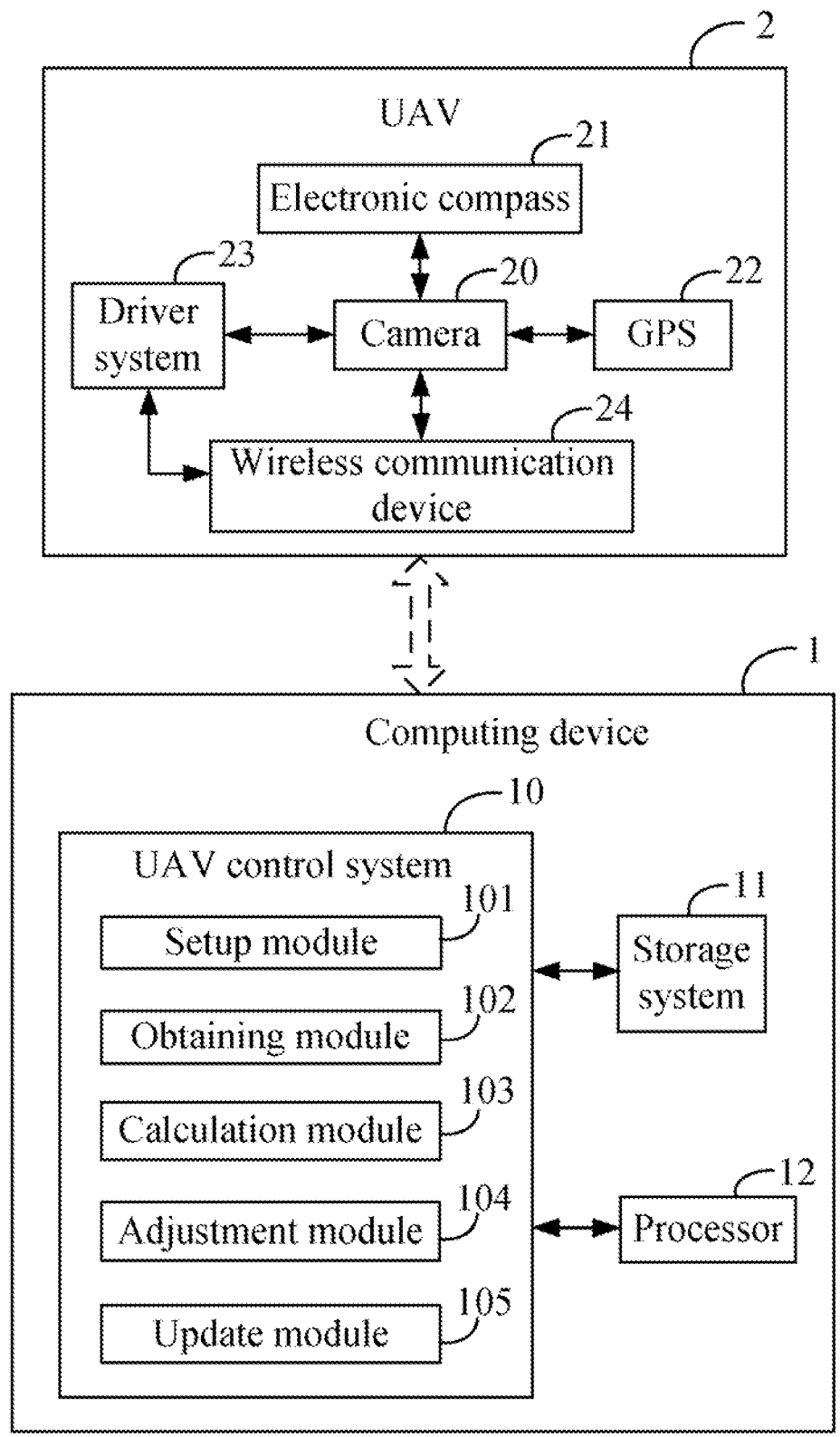
FIG. 1 is one embodiment of application of a computing device.

FIG. 1 is one embodiment of an application of a computing device 1. The computing device 1 may be a host computer, a workstation computer, or a server computer. The computing device 1 communicates with an unmanned aerial vehicle (UAV) 2 via a wireless link. In one embodiment, the computing device 1 may include a UAV control system 10, a storage system 11, and at least one processor 12. The UAV control system 10 controls the UAV 2 to capture images of a target. The UAV control system 10 includes a setup module 101, an obtaining module 102, a calculation module 103, an adjustment module 104, and an update module 105. The modules 101-105 may comprise computerized code in the form of one or more programs that are stored in the storage system 11. The computerized code includes instructions that are executed by the at least one processor 12, to provide the aforementioned functions of the UAV control system 10. A detailed description of the functions of the modules 101-105 is given in reference to FIG. 3.

The UAV 2 may include a camera 20, an electronic compass 21, a global position system (GPS) 22, a driver system 23, and a wireless communication device 24 (e.g., a radio transceiver). The camera 20 captures images of scenes in front of the camera 20. The electronic compass 21 detects a viewing direction of the camera 22. The viewing direction describes an orientation of the camera 20. When the camera 20 is rotated (e.g., rotated to the left or the right), the viewing direction changes accordingly. When the viewing direction of the camera 20 changes, contents of a viewing area of the camera 20 also change. The GPS 22 detects coordinates of the camera 20. The coordinates of the camera 20 may include a longitude, a latitude, and an altitude. The wireless communication system 24 may receive adjustment parameters of the camera 20 from the computing device 1 and transfer the adjustment parameters to the driver system 23. The driver system 23 may be connected to the camera 20 and include one or more motors (e.g., stepper motors) or electromechanical devices (such as piezo-electric drivers). The driver system 23 adjusts the viewing direction of the camera 20 according to the adjustment parameters, so that the optical lens of the camera 20 faces a target.

Figure 2:
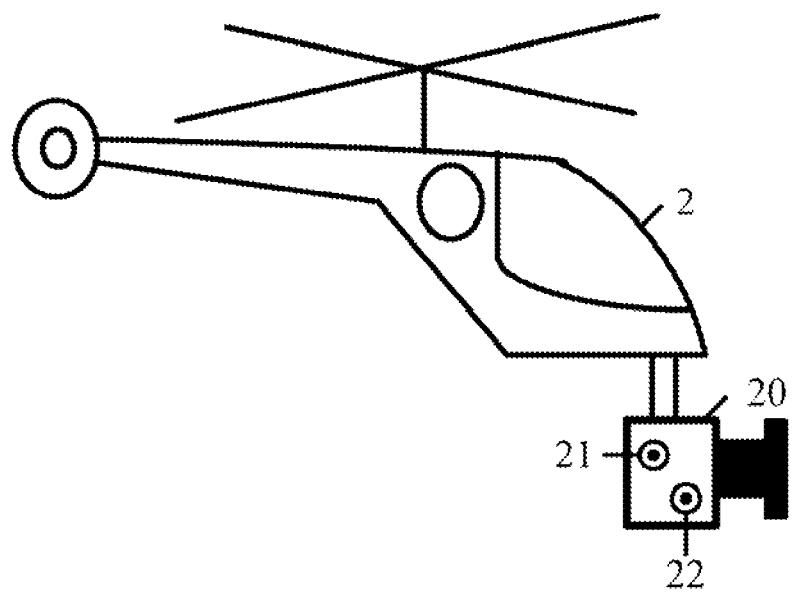
FIG. 2 is one embodiment illustrating installation positions of a camera, an electronic compass, and a global position system in an unmanned aerial vehicle (UAV).

FIG. 2 is one embodiment illustrating installation positions of the camera 20, the electronic compass 21, and the GPS 22 in the UAV 2. The camera 20 may be installed below a body of the UAV 2. The electronic compass 21 and the GPS 22 may be installed in the camera 20.

Figure 3:
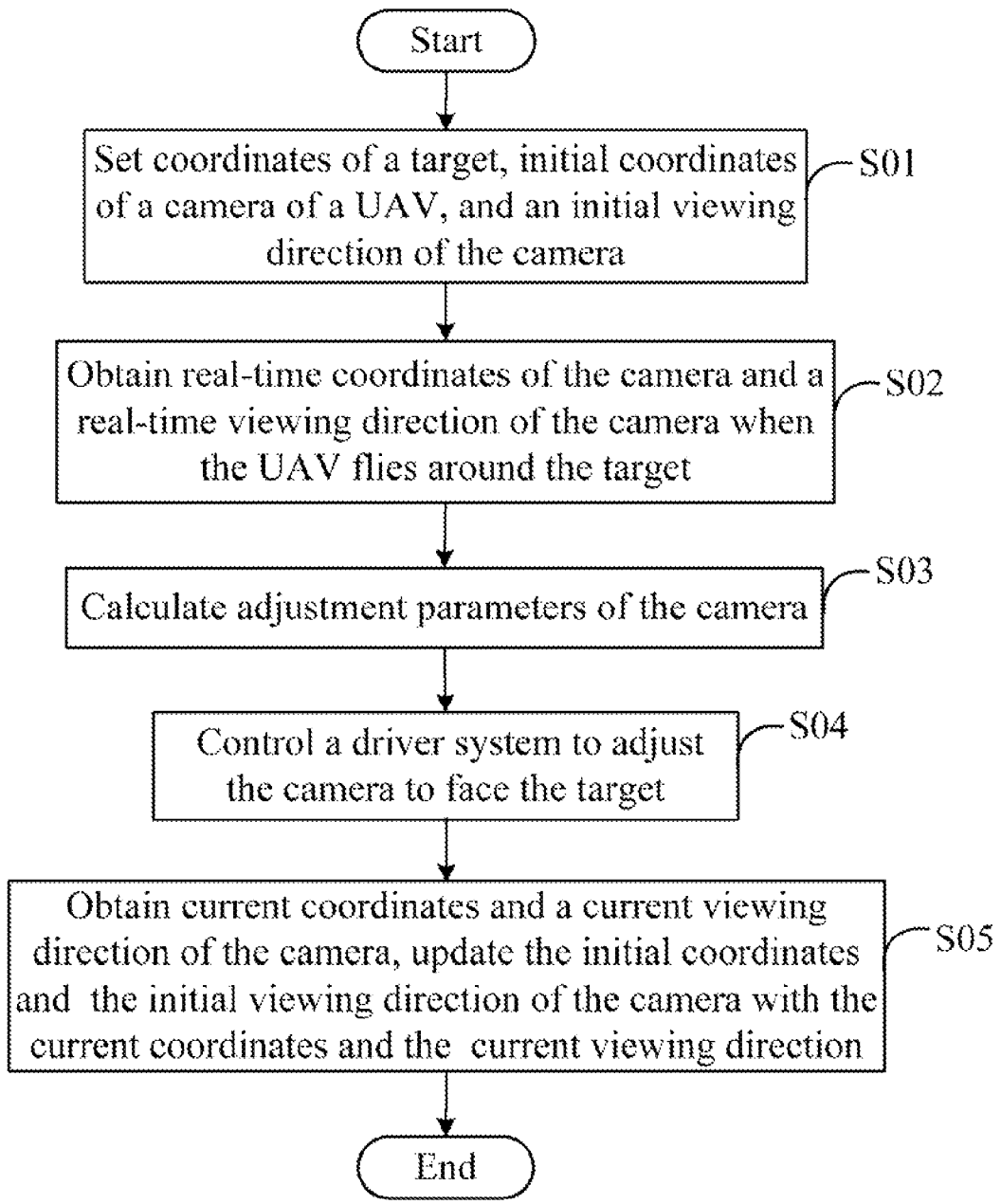
FIG. 3 is a flowchart of one embodiment of a method for controlling the UAV of FIG. 2 to capture images of a target using the computing device of FIG. 1.

FIG. 3 is a flowchart of one embodiment of a method for controlling the UAV 2 to capture images of a target using the computing device 1 of FIG. 1. Depending on the embodiment, additional steps may be added, others removed, and the ordering of the steps may be changed.

In step S01, the setup module 101 sets coordinates of the target, initial coordinates of the camera 20, and an initial viewing direction of the camera 20. The initial coordinates of the camera 20 indicate an optimal position to capture images of the target. The UAV 2 may first be piloted remotely to the optimal position for capturing images of the target. The initial viewing direction of the camera 20 indicates a direction along which the camera 20 faces while the camera 20 is positioned at the optimal position with the initial coordinates, to capture the target. In this embodiment, the coordinates of the target include a first longitude, a first latitude, and a first altitude. The initial coordinates of the camera 20 include a second longitude, a second latitude, and a second altitude. The setup module 101 further stores the coordinates of the target, the initial coordinates of the camera 20, and the initial viewing direction of the camera 20 into the storage system 11.

In step S02, the obtaining module 102 obtains real-time coordinates of the camera 20 and a real-time viewing direction of the camera 20 when the UAV 2 flies around the target. In this embodiment, the GPS 22 detects the real-time coordinates. The electronic compass 21 detects the real-time viewing direction. The wireless communication device 24 transfers the real-time coordinates detected by the GPS 22 and the real-time viewing direction of the camera 20 detected by the electronic compass 21 to the computer device 1. The real-time coordinates of the camera 20 may include a third longitude, a third latitude, and a third altitude.

In step S03, the calculation module 103 calculates adjustment parameters of the camera 20 according to the initial coordinates, the initial viewing direction, the real-time coordinates, and the real-time viewing direction of the camera 20. In one embodiment, the adjustment parameters include a horizontal rotation angle and a vertical rotation angle.

Figure 4:
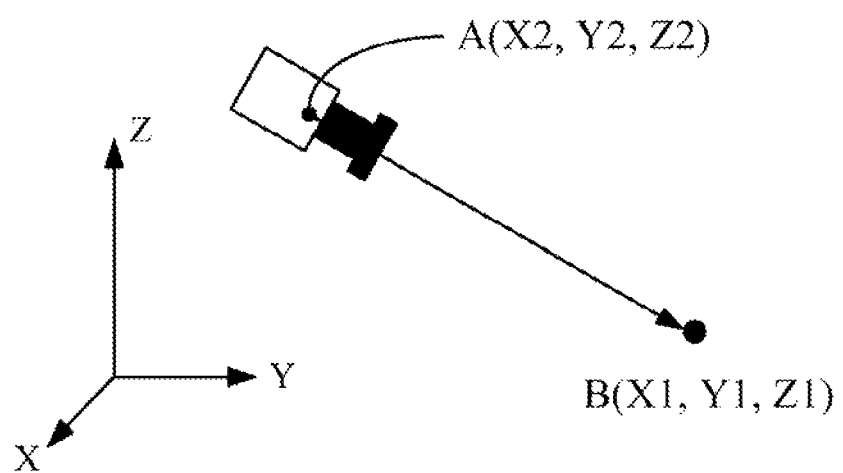
FIG. 4 and FIG. 5 illustrate one embodiment of calculating adjustment parameters of the camera of FIG. 2.
Figure 5:
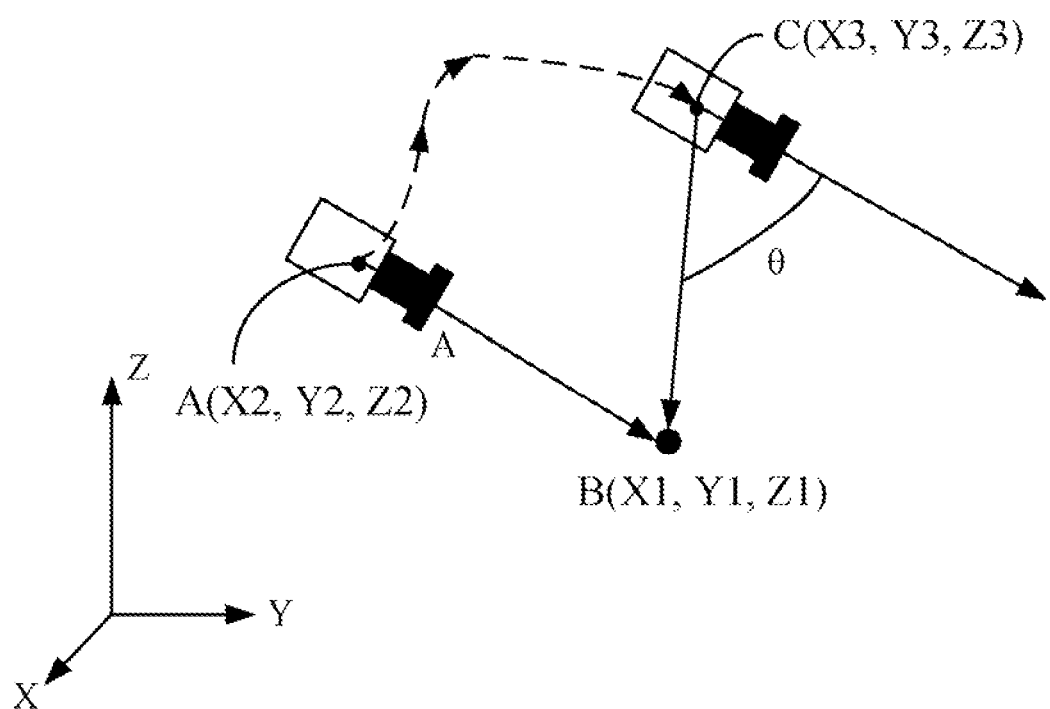

FIG. 4 and FIG. 5 illustrate one embodiment of calculating the horizontal rotation angle and the vertical rotation angle of the camera 20. In this embodiment, the coordinates of the target, the initial coordinates of the camera 20, and the real-time coordinates of the camera 20 are geographic coordinates. The calculation module 10 transforms all the geographic coordinates into Cartesian coordinates. With respect to FIGS. 4-5, a point "A" denotes an initial location of the camera 20 with coordinates (X2, Y2, Z2). A point "B" denotes a location of the target with coordinates (X1, Y1, Z1). A point "C" denotes a real-time location of the camera 20 with coordinates (X3, Y3, Z3). A line from "A" to "B" denotes the initial viewing direction of the camera 20. A dashed line between "A" and "C" denotes a movement path of the UAV 2 from "A" to "B." The coordinates (X1, Y1, Z1), (X2, Y2, Z2), and (X3, Y3, Z3) are Cartesian coordinates.

The calculation module 103 projects the points of "A," "B," "C" to an XY plane. A projection of a line from "C" to "B" and a projection of the line from "A" to "B" in the XY plane are obtained. The calculation module 103 calculates an angle between the projection of the line from "C" to "B" and the projection of the line from "A" to "B" in the XY plane. The calculated angle is the horizontal rotation angle of the camera 20. Similarly, the calculation module 103 projects the points of "A," "B," "C" to an YZ plane, and accordingly calculates the vertical rotation angle of the camera 20.

In step S04, the adjustment module 104 transfers the adjustment parameters to the driver system 23 via the wireless communication system 24, such that the driver system 23 adjusts the camera 20 to face the target according to the adjustment parameters. In this embodiment, the adjustment parameters may include a horizontal rotation angle and a vertical rotation angle. The driver system 23 may first rotate the camera 20 according to the horizontal rotation angle, and then rotate the camera 20 according to the vertical rotation angle. In another example, the driver system 23 may first rotate the camera 20 according to the vertical rotation angle, and then rotate the camera 20 according to the horizontal rotation angle.

When the camera 20 faces the target, in step S05, the update module 105 obtains current coordinates and a current viewing direction of the camera 20. The update module 105 further updates the initial coordinates of the camera 20 stored in the storage system 11 with the current coordinates of the camera 20, and updates the initial viewing direction of the camera 20 stored in the storage system 11 with the current viewing direction of the camera 20. As such, the computing device 1 can continue to calculate the adjusting parameters of the camera 20 to adjust the viewing direction of the camera 20.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling an unmanned aerial vehicle (UAV) equipped with a camera to capture images of a target being executed by a processor of a computing device, the method comprising:

setting coordinates of the target, initial coordinates of the camera, and an initial viewing direction of the camera, and storing the coordinates of the target, the initial coordinates of the camera, and the initial viewing direction of the camera into a storage system of the computing device;

obtaining real-time coordinates of the camera and a real-time viewing direction of the camera when the UAV flies around the target;

calculating adjustment parameters of the camera according to the initial coordinates, the initial viewing direction, the real-time coordinates, and the real-time viewing direction of the camera, wherein the adjustment parameters comprise a horizontal rotation angle and a vertical rotation angle, wherein the horizontal rotation angle is calculated by projecting a first point with the initial coordinates of the camera, a second point with the coordinates of the target, and a third point with the real-time coordinates of the camera to an XY plane of a Cartesian coordinate system, and calculating a first angle between a first projection of a line from the third point to the second point and a second projection of a line from the first point to the second point in the XY plane as the horizontal rotation angle, and the vertical rotation angle is calculated by projecting the first point, the second point, and the third point to an YZ plane of the Cartesian coordinate system, and calculating a second angle between a third projection of a line from the third point to the second point and a fourth projection of a line from the first point to the second point in the XY plane as the vertical rotation angle; and adjusting the camera to face the target according to the adjusting parameters by transferring the adjusting parameters of the camera to a driver system connected to the camera.

2. The method of claim 1, further comprising:

obtaining current coordinates and a current viewing direction of the camera when the camera faces the target;

updating the initial coordinates of the camera stored in the storage system with the current coordinates of the camera; and updating the initial viewing direction of the camera stored in the storage system with the real-time viewing direction of the camera.

3. The method of claim 1, wherein the coordinates of the target comprise a first longitude, a first latitude, and a first altitude, and the initial coordinates of the camera comprise a second longitude, a second latitude, and a second altitude.

4. The method of claim 1, wherein the driver system firstly rotates the camera according to the horizontal rotation angle and secondly rotates the camera according to the vertical rotation angle.

5. The method of claim 1, wherein the driver system firstly rotate the camera according to the vertical rotation angle and secondly rotate the camera according to the horizontal rotation angle.

6. A computing device, comprising:

a storage system;

at least one processor; and an unmanned aerial vehicle (UAV) control system comprising one or more programs that are stored in the storage system and executed by the at least one processor, the one or more programs comprising instructions to:

set coordinates of a target, initial coordinates of a camera installed in a UAV, and an initial viewing direction of the camera, and store the coordinates of the target, the initial coordinates of the camera, and the initial viewing direction of the camera into a storage system of the computing device;

obtain real-time coordinates of the camera and a real-time viewing direction of the camera when the UAV flies around the target;

calculate adjustment parameters of the camera according to the initial coordinates, the initial viewing direction, the real-time coordinates, and the real-time viewing direction of the camera, wherein the adjustment parameters comprise a horizontal rotation angle and a vertical rotation angle, wherein the horizontal rotation angle is calculated by projecting a first point with the initial coordinates of the camera, a second point with the coordinates of the target, and a third point with the real-time coordinates of the camera to an XY plane of a Cartesian coordinate system, and calculating a first angle between a first projection of a line from the third point to the second point and a second projection of a line from the first point to the second point in the XY plane as the horizontal rotation angle, and the vertical rotation angle is calculated by projecting the first point, the second point, and the third point to an YZ plane of the Cartesian coordinate system, and calculating a second angle between a third projection of a line from the third point to the second point and a fourth projection of a line from the first point to the second point in the XY plane as the vertical rotation angle; and transfer the adjusting parameters of the camera to a driver system connected to the camera, such that the driver system adjusts the camera to face the target according to the adjusting parameters.

7. The computing device of claim 6, wherein the one or more programs further comprise instructions to:

obtain current coordinates and a current viewing direction of the camera when the camera faces the target;

update the initial coordinates of the camera stored in the storage system with the current coordinates of the camera; and update the initial viewing direction of the camera stored in the storage system with the real-time viewing direction of the camera.

8. The computing device of claim 6, wherein the coordinates of the target comprise a first longitude, a first latitude, and a first altitude, and the initial coordinates of the camera comprise a second longitude, a second latitude, and a second altitude.

9. The computing device of claim 6, wherein the driver system firstly rotates the camera according to the horizontal rotation angle and secondly rotates the camera according to the vertical rotation angle.

10. The computing device of claim 6, wherein the driver system firstly rotate the camera according to the vertical rotation angle and secondly rotate the camera according to the horizontal rotation angle.

11. A non-transitory computer-readable storage medium storing a set of instructions, the set of instructions capable of being executed by a processor of a computing device to implement a method for controlling an unmanned aerial vehicle (UAV) equipped with a camera to capture images of a target, the method comprising:

setting coordinates of a target, initial coordinates of the camera, and an initial viewing direction of the camera, and storing the coordinates of the target, the initial coordinates of the camera, and the initial viewing direction of the camera into a storage system of the computing device;

obtaining real-time coordinates of the camera and a real-time viewing direction of the camera when the UAV flies around the target;

calculating adjustment parameters of the camera according to the initial coordinates, the initial viewing direction, the real-time coordinates, and the real-time viewing direction of the camera, wherein the adjustment parameters comprise a horizontal rotation angle and a vertical rotation angle, wherein the horizontal rotation angle is calculated by projecting a first point with the initial coordinates of the camera, a second point with the coordinates of the target, and a third point with the real-time coordinates of the camera to an XY plane of a Cartesian coordinate system, and calculating a first angle between a first projection of a line from the third point to the second point and a second projection of a line from the first point to the second point in the XY plane as the horizontal rotation angle, and the vertical rotation angle is calculated by projecting the first point, the second point, and the third point to an YZ plane of the Cartesian coordinate system, and calculating a second angle between a third projection of a line from the third point to the second point and a fourth projection of a line from the first point to the second point in the XY plane as the vertical rotation angle; and transferring the adjusting parameters of the camera to a driver system connected to the camera, such that the driver system adjusts the camera to face the target according to the adjusting parameters.

12. The storage medium of claim 11, wherein the method further comprises:

obtaining current coordinates and a current viewing direction of the camera when the camera faces the target;

updating the initial coordinates of the camera stored in the storage system with the current coordinates of the camera; and updating the initial viewing direction of the camera stored in the storage system with the real-time viewing direction of the camera.

13. The storage medium of claim 11, wherein the coordinates of the target comprise a first longitude, a first latitude, and a first altitude, and the initial coordinates of the camera comprise a second longitude, a second latitude, and a second altitude.

14. The storage medium of claim 11, wherein the driver system firstly rotates the camera according to the horizontal rotation angle and secondly rotates the camera according to the vertical rotation angle.

15. The storage medium of claim 11, wherein the driver system firstly rotate the camera according to the vertical rotation angle and secondly rotate the camera according to the horizontal rotation angle.

* * * * *